US009419729B2

(12) United States Patent
Androni et al.

(10) Patent No.: US 9,419,729 B2
(45) Date of Patent: Aug. 16, 2016

(54) BRANCHING UNIT FOR AN OPTICAL TELECOMMUNICATION LINK

(71) Applicant: PADTEC S.A., Campinas/SP (BR)

(72) Inventors: Daniele Androni, Gragnano (IT); Aldo Righetti, Milan (IT)

(73) Assignee: PADTEC S.A., Campinas (BR)

( * ) Notice: Subject to any disclaimer, the term of this patent is extended or adjusted under 35 U.S.C. 154(b) by 126 days.

(21) Appl. No.: 14/540,390

(22) Filed: Nov. 13, 2014

(65) Prior Publication Data

US 2015/0131191 A1    May 14, 2015

(30) Foreign Application Priority Data

Nov. 14, 2013   (EP) .................................. 13425147.9

(51) Int. Cl.
  *B23K 11/24*   (2006.01)
  *H04B 10/80*   (2013.01)
  *H01H 45/14*   (2006.01)
  *H01H 47/00*   (2006.01)
  *H04B 3/44*    (2006.01)

(52) U.S. Cl.
  CPC ............. *H04B 10/808* (2013.01); *H01H 45/14* (2013.01); *H01H 47/001* (2013.01); *H04B 3/44* (2013.01); *H04B 10/80* (2013.01)

(58) Field of Classification Search
  USPC ............................ 361/191; 307/112, 126, 130
  See application file for complete search history.

(56) References Cited

U.S. PATENT DOCUMENTS

| 5,491,368 A * | 2/1996 | Yamamoto ............... H04B 3/44 307/113 |
| 5,517,383 A | 5/1996 | Webb |
| 5,841,205 A | 11/1998 | Webb |
| 6,166,836 A | 12/2000 | Crameri et al. |
| 2014/0103739 A1* | 4/2014 | Takigawa .................. H02J 4/00 307/112 |

FOREIGN PATENT DOCUMENTS

| EP | 1220468 A1 | 7/2002 |
| WO | 9706610 A1 | 2/1997 |

* cited by examiner

*Primary Examiner* — Danny Nguyen
(74) *Attorney, Agent, or Firm* — Pearne & Gordon LLP (57) ABSTRACT

A branching unit (1) for an optical telecommunication link (100), the unit comprising a first (2), a second (3) and a third terminal (4) for termination of conductors of respective branch cables in use, a fourth terminal (5) for connection to a sea earth (6) in use, and a circuit (8) comprising a plurality of relays comprising at least a first, a second and a third relay associated to respectively the first, second and third terminal, the circuit being structured for connecting together two terminals out of the first, second and third terminal and for connecting the remaining terminal to the fourth terminal, depending on a sequence of power feeding at the first, second and third terminals, in use, wherein the circuit (8) comprises a sea earth circuit (9) terminated at one end to the fourth terminal and a bidirectional triode thyristor (13) placed along the sea earth circuit, a driving circuit (19) being provided for driving the bidirectional triode thyristor so as to trigger the bidirectional triode thyristor in a conduction state only upon complete switch-over of one relay of the group consisting in the first, second and third relay.

15 Claims, 4 Drawing Sheets

Fig. 4 ly powered optical telecommunication link.

Submarine optical telecommunication systems are known which comprise an optical telecommunication link optically connecting at least three land stations. The optical telecommunication link comprises at least one submerged branching unit and at least three optical cable branches each one connecting the branching unit with a respective land station. Each branch comprises an optical fiber cable (at least partly submarine) comprising a plurality of continuous optical fibers. Each land station comprises respective transmitter(s) and/or receiver(s) for transmitting and/or receiving the optical signal propagating along the optical fibers.

Optical telecommunication links are known which are (electrical) power fed from land station(s) in order to power opto-electronic and/or electric and/or electronic devices placed along the link. For example, in case the link spans over thousands of kilometres (up to 8-10.000 km) without opto-electronic conversion of the optical signal, various tens of optical amplifiers are cascaded along the link. The optical amplifiers are pumped and/or controlled by opto-electronic devices such as laser pumps, photodetectors, and related electronics, which need electrical power to properly work. In the present application the terms power, current, energy, voltage, circuit, terminal and the like refer to their electrical meaning.

In order to power feed the link, typically with direct current, power feeding equipment (PFE) are provided at one or more (typically every one) of the land stations and the optical cable comprises a continuous electrically conducting element (typically in the form of a tubular metal sheet, e.g. made of copper) for conducting the electrical energy.

Branching units are known which provide structural, optical and electrical continuity to the link. U.S. Pat. No. 5,517,383(A) discloses a branching unit for use in submarine telecommunications optical cable systems which employs electrical power feeding for repeater/regenerators of the cable system. The unit terminates three line cables and a sea earth and includes first, second the third high voltage relays, only one of which is energized at a time. When electrical power is supplied between any two line terminations an associated relay coil is energized so that its contacts isolate the third line termination and connect it to the sea earth termination via fourth, or fifth, relay contacts. The branching unit also includes a plurality of optical regenerators, for optical path switching purposes, which require electrical power feeding and whose power feed circuits are connected in parallel with each of the relay coils. When any relay is energized, i.e. the cable system is powered up, the regenerators are also powered. The zener diodes provide voltage supply to the regenerator power feed circuits as well as providing surge protection for them and the relay coils simultaneously. The fourth- and fifth relays serve to prevent arc transfer in the first, second and third relays.

U.S. Pat. No. 5,841,205(A) discloses a branching unit for an underwater communications system arranged so as to provide remote hot switching for electrical power. The unit has three terminations each for a different one of three line cables and one or more power demand circuits requiring an electrical power feed from the line cables. A first switch is actuable to complete a current path between an appropriate pair of the three terminations via one or more of the power demand circuits depending upon relative line voltage. A second switch is actuable after actuation of the first switch depending upon current supplied to the power demand circuit(s) rising above that which occurs upon action of the first switch. The second switch completes a circuit between the non-paired termination and a fourth termination for a sea-earth.

The Applicant has realized that in the known branching units as the above, while during their configuration it is avoided an arc transfer at the switchover relay, an arc may still form at the relay contacts connecting to the sea earth termination, unless it is performed an additional step of discharging the charged spur cable at the land station, as described in the above cited U.S. Pat. No. 5,841,205(A). Such additional step also requires care to properly configure the first (switchover) relay and the second (sea earth) relay so that they are actuated at different levels of current.

The Applicant has also realized that while during power-up for configuration of the branching unit the current is under total control, this is not the same in case of fault in the cable during operation, which may led to open circuit (complete rupture of the conductor inside the cable without loss of isolation) or short circuit (conductor of the cable connected to sea earth with or without complete breakup of the cable), wherein high current surge are generated. In particular, the Applicant has realized that in case of open circuit along one line (i.e. trunk) cable, the above known branching unit will at first completely de-configure, with all the three terminations connected together and the sea earth relay open. Two PFEs become therefore connected together (one PFE is cut-out because of breakup of the line cable conductor), and immediately before this connection they have generated an overvoltage because of the open circuit they have seen. Upon their connection, a high surge will flow between the respective two terminations which in turn will actuate the relay at the third termination and the sea earth relay. Since the surge has a very steep front, the difference in the levels of current of the two latter relays becomes negligible, so that the two relays are actuated in uncontrolled time sequence. This situation leaves open the possibility that an arc occurs at one or both the relays, and possibly a detrimental arc transfer occurs at the switchover relay (at the third termination).

It is an aim of the present invention to provide a branching unit which may solve the above problem and/or improve known branching units.

The above aim is achieved by a branching unit, an optical telecommunication link and a method for configuring the branching unit, according to the following aspects in their various embodiments, and/or according to one or more of the appended claims which represent further embodiments of the present invention, also combined with the following embodiments.

In one aspect the invention relates to a branching unit for an optical telecommunication link, the unit comprising a first, a second and a third terminal for termination of conductors of respective branch cables in use, a fourth terminal for connection to a sea earth in use, and a circuit comprising a plurality of (preferably high voltage) relays comprising at least a first, a second and a third relay associated to respectively the first, second and third terminal, the circuit being structured for connecting together two terminals out of the group consisting in the first, second and third terminal and for connecting the remaining terminal of the group consisting in the first, second and third terminal to the fourth terminal, depending on a sequence of power feeding at the first, second and third terminals, in use.

In the present description and claims the term sea comprises any water basin including a lake or the like.

Preferably the circuit comprises a sea earth circuit terminated at one end to the fourth terminal. Preferably the circuit comprises at least one bidirectional triode thyristor placed along the sea earth circuit (with a first main terminal on the side of the fourth terminal and a second main terminal on the opposite side).

Preferably the branching unit comprises a driving circuit for driving the bidirectional triode thyristor, the driving circuit being configured for triggering the bidirectional triode thyristor in a conduction state (more preferably only) after complete switch-over of one relay of the group consisting in the first, second and third relay.

Preferably the driving circuit is configured for driving the bidirectional triode thyristor in function of a current across the sea earth circuit.

In the present description and claims the phrase bidirectional triode thyristor refers to an electronic component (also known as bilateral triode thyristor or with the acronym TRIAC from Triode for Alternating Current) that can conduct current in either direction between two main terminals (which are normally open) when a sufficient current is applied to a gate terminal (status of thyristor triggered). The minimum gate current able to trigger the component is called gate threshold current. The phrase 'driving the bidirectional triode thyristor' refers to the feeding of current/voltage to the gate terminal in order to change the conduction status (open or close) of the bidirectional triode thyristor, typically to change its conduction state from open to close. Once triggered, the component typically continues to conduct, also with the gate current below threshold, until the current between main terminals drops below a certain threshold called the holding current. The phrase bidirectional triode thyristor also includes the assembly of two thyristors (or Silicon Controlled Rectifier—SCR) connected in antiparallel to a common gate terminal.

Preferably the sea earth circuit is terminated at other three ends respectively to the first, second and third relay. Preferably the sea earth circuit comprises a first, a second and a third earth line terminated at two respective opposite ends respectively to the fourth terminal and to respectively a first, a second and a third switch of respectively the first, second and third relay. Preferably the sea earth circuit comprises a common section common to the first, second and third earth line, the common section being terminated at the fourth terminal.

Preferably the bidirectional triode thyristor is placed along the common section of the sea earth circuit.

According to the Applicant the feature that the circuit comprises a bidirectional triode thyristor as above efficiently provide protection to the relays (and/or other components in the branching unit) during powering up and configuration of the branching unit and in case of (at least one type of) faults along the cable which causes sudden and uncontrolled de-configuration of the branching unit. In particular, during branching unit configuration the bidirectional triode thyristor can be maintained in the untriggered state while terminal relays are switching over so as to avoid discharge to sea earth and arc (including arc transfer) formation. Only upon completion of the switching over of the terminal relay, the bidirectional triode thyristor is triggered so that the terminal to be earthed is actually connected to earth. This procedure does not require discharge of the charged spur cable at the land station.

In addition, in case of open-circuit fault as above described, when the branching unit is completely de-configured the first time the bidirectional triode thyristor is set untriggered. The bidirectional triode thyristor remains subsequently untriggered (open state) and it is triggered again (if any) only upon complete switch-over of one relay associated to a terminal, for example when a sufficient current flows across the sea earth circuit (e.g. with a certain delay after completion of the unwanted switching over of the terminal relay corresponding to the faulted cable, such switching over possibly inducing some current in the sea earth circuit because of the discharge of the faulted cable), thus avoiding any arc formation.

Preferably each relay of said plurality of relays comprises a switch and an actuator for actuating the switch. More preferably the actuator is an electromagnet, such as a coil. Advantageously this allows the activation of the actuators by the currents across selected sections of the circuit(s). Preferably said first, second and third relay have respectively a first, a second and a third switch and respectively a first, a second and a third actuator.

Preferably the circuit comprises a first, a second and a third termination line respectively terminated at one end to the first, second and third terminal.

The term line comprises any electrical conducting connection (including a single point in case the two termination ends of the line coincide) capable of electrically connecting the two opposite termination ends thereof, the line possibly comprising, depending upon the context, one or more switch along it, wherein in at least one configuration of the switch(es) it is provided electrical continuity.

Preferably the first, second and third switch have a respective first contact belonging respectively to the first, second and third termination line, a respective second contact, a respective third contact belonging to the sea earth circuit and a respective mobile contact, the respective actuator of each relay being configured for actuating the mobile contact so as to connect the first contact with either the second contact or the third contact.

Preferably the circuit comprises a first line terminated at two opposite ends to the second contacts of respectively the first and second switch, a second line terminated at two opposite ends to the second contacts of respectively the first and the third switch and a third line terminated at two opposite ends to the second contacts of respectively the second and third switch.

Preferably the first, second and third relay are configured for connecting respectively the first, second and third terminal either to the sea earth circuit or to the other two terminals in function of the current along respectively the third, second and first line.

Preferably the first, second and third termination line are terminated at another end to the respective first contact of respectively the first, second and third switch.

Preferably the first, second and third switch are configured so that when the respective actuator is not powered, the respective mobile contact connects the first contact with the second contact. Advantageously in this way the first, second and third terminal are connected together in absence of power.

Preferably the respective actuator of the first, second and third relay are placed respectively along the third line, the second line and the first line (so as to be subject to the respective current along the line). Advantageously in this way a delta configuration of the relays is achieved.

Preferably the first, second and third earth line are terminated at one respective end to the respective third contact of respectively the first, second and third switch.

Preferably the driving circuit is directly connected to the sea earth circuit (more preferably to the common section of the latter) on the side of the second main terminal, so as to receive a current flowing across the sea earth circuit. In this way advantageously the gate terminal receive the triggering current directly from the section of the sea earth circuit on the side of the second main terminal, thus simplifying the structure of the circuit.

Preferably said plurality of relays comprises a fourth, a fifth and a sixth relay having respectively a fourth, a fifth and a sixth switch and respectively a fourth, a fifth and a sixth actuator.

Preferably the fourth, fifth and sixth switch are placed along a respective common section of respectively the first and the second line, the first and the third line and the second and the third line so as to either open or close the respective common section, depending on a current along the sea earth circuit (more preferably on a current along respectively the first, second and third sea earth line).

Preferably the fourth, fifth and sixth switch have a respective first and second contact, the first contact being on the side of respectively the first, second and third switch, and a respective mobile contact, the respective actuator of each relay being configured for actuating the mobile contact so as to either connect the first and second contact or to isolate the first and second contact, depending on a current along the sea earth circuit (more preferably on a current along respectively the first, second and third sea earth line).

Preferably the fourth, fifth and sixth switch are configured so that when the respective actuator is not powered, the respective mobile contact close the respective common section.

Preferably the respective actuator of the fourth, fifth and sixth relay is placed along the first, second and third earth line respectively (so as to be subject to the current along the respective earth line).

Preferably the respective actuator of the fourth, fifth and sixth relay is not placed along respectively the other two earth lines (so as to be subject only to the current along the respective earth line).

Advantageously the fourth, fifth and sixth relays as above allows to isolate the respective terminal, if earthed in operation, from the central (delta-configured) circuit so that an arc is avoided at the respective switch-over switch in case of sudden deconfiguration of the branching unit, for example because of a cable fault as above described.

Preferably said plurality of relays comprises a seventh, an eighth and a ninth relay having respectively a seventh, an eighth and a ninth switch and respectively a seventh, an eighth and a ninth actuator.

Preferably the seventh, eighth and ninth actuator is coincident with respectively the fourth, fifth and sixth actuator (in order to simplify the structure of the circuit).

Preferably the seventh, eighth and ninth switch have a respective first contact in connection with respectively the first, second and third termination line, a respective second contact in connection with respectively the first, second and third earth line, and a respective mobile contact, the respective actuator of each relay being configured for actuating the mobile contact so as to either connect the first and second contact or to isolate the first and second contact, depending on a current along the sea earth circuit (more preferably on a current along respectively the first, second and third sea earth line).

Preferably the seventh, eighth and ninth switch are configured so that when the respective actuator is not powered, the respective mobile contact isolates the first contact with the second contact. Advantageously the seventh, eighth and ninth relays as above guarantee that the sea earth circuit remains electrically connected with the respective earthed (in operation) terminal even in case the respective switchover relay deconfigure, for example because of a cable fault as above described. Therefore current across the earthed terminal and the respective sea earth line is maintained, this in turn maintains open the switch of the respective relay among the fourth, fifth and sixth relay and this in turn avoids a possible arc formation at the respective switch-over switch in case of sudden deconfiguration of the branching unit as above described.

It is noted that the branching unit with the fourth, fifth, sixth and possibly seventh, eighth and ninth relay as above disclosed is considered an invention per se, independently by the presence of the above described bidirectional triode thyristor, which solves the above described problems of arc formation in case of fault.

Preferably the circuit comprises a first, a second and a third inductor placed along respectively the first, second and third termination line. In one embodiment the inductors have an inductance greater or equal to 100 μH, more preferably greater or equal to 200 μH, and or smaller or equal to 400 μH, more preferably smaller or equal to 300 μH. Preferably the inductors are configured so that a time rate of change of the current through them does not exceeds 100 A/μs and/or a time rate of change of the voltage across them does not exceeds 1 kV/μs.

Preferably the branching unit comprises a sea earth cable connected to the fourth terminal for connecting the latter to the water in which the branching unit is submerged, in use.

In a second aspect the invention relates to an optical telecommunication link comprising at least one submerged branching unit according to the first aspect of the present invention, in its various embodiments, a first, a second and a third land station comprising respectively a first, a second and a third power feeding equipment having respective first terminal, a first, a second and a third cable branch having a respective conductor continuously running along them and having a respective end terminated respectively at the first, second and third terminal of the branching unit and a respective opposite end terminated respectively at the first terminal of the first, second and third power feeding equipment. Preferably each power feeding equipment has a respective sea earth terminal connected to the sea.

It is further provided an optical telecommunication system comprising the optical telecommunication link according to the second aspect of the present invention, in its various embodiments, each cable branch comprising a plurality of continuous optical fibers running along it and each land station comprising a respective transmitter and/or receiver for transmitting and/or receiving an optical signal propagating along the optical fibers.

In a further aspect, the invention relates to a method for configuring the branching unit according to the first aspect of the present invention, in its various embodiments, the method comprising: sending a current at two terminals out of the group consisting in the first, second and third terminal until the circuit connects together said two terminals therebetween and connects the remaining terminal of the group consisting in the first, second and third terminal to the fourth terminal, by switching of a switch of a relay associated to the remaining terminal.

Further characteristics and advantages will be more evident from the detailed description of some exemplary, though not exclusive, embodiments of a branching unit in accordance with the present invention, a related optical telecommunication link and a related configuration method. This description will be disclosed below with reference to the accompanying figures, provided to a merely indicative and therefore non-limiting purpose, in which.

With reference to the accompanying figures, the numeral reference 100 indicates an optical telecommunication link according to the present invention and the numeral reference 1 indicates a branching unit according to the present invention. In the present description and figures, the same reference is used to indicate the same or corresponding element, taking into account its possible various embodiments.

Figure 1:
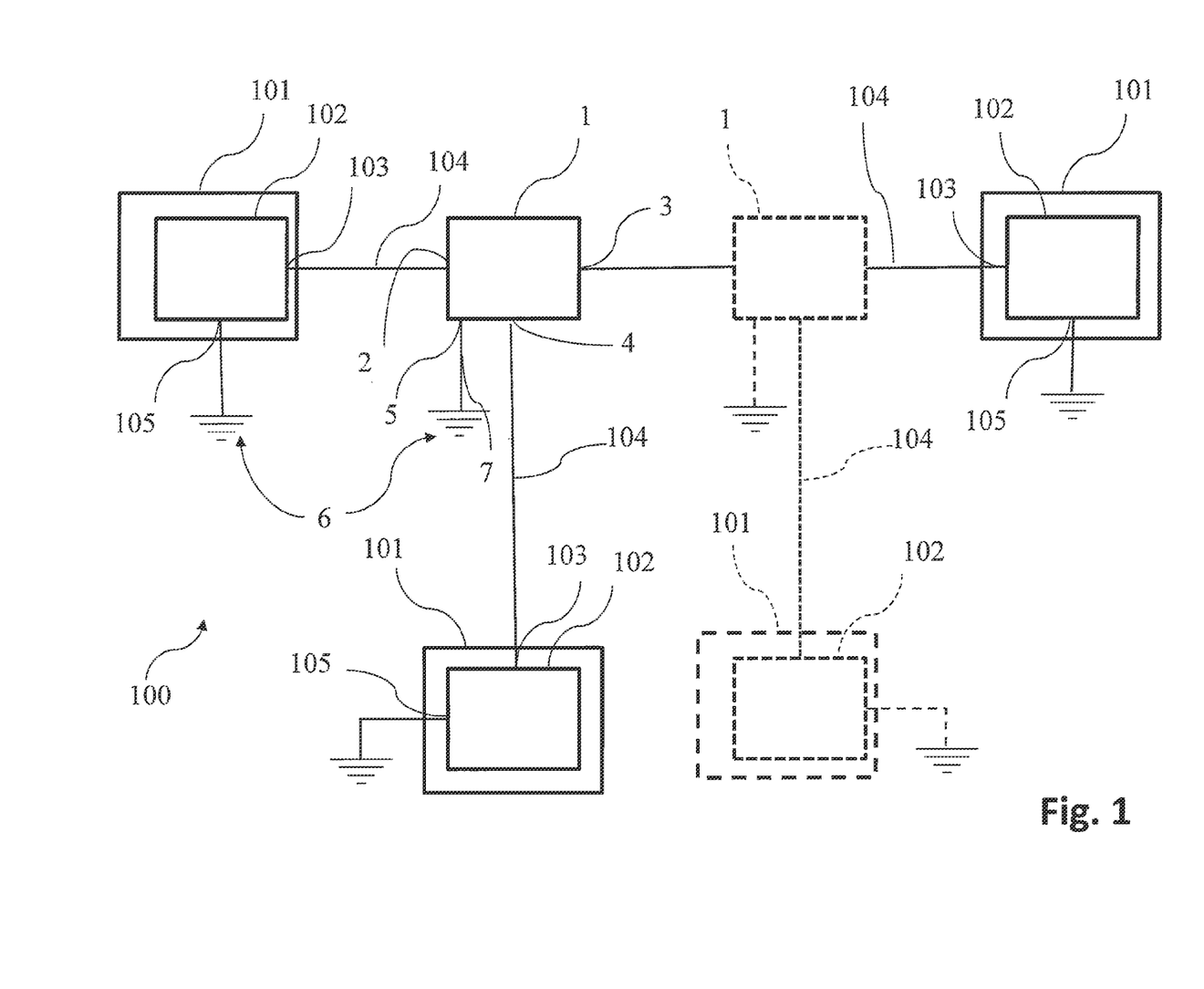
FIG. 1 shows in terms of logical blocks a schematic diagram of an optical telecommunication link according to the present invention.

The optical telecommunication link 100 comprises at least one submerged branching unit 1 (shown in solid line), a first, a second and a third land station 101 comprising respectively a first, a second and a third power feeding equipment (PFE) 102 having respective first terminal 103, a first, a second and a third cable branch 104 having a respective conductor continuously running along them and having a respective end terminated respectively at a first 2, second 3 and third 4 terminal of the branching unit 1, and a respective opposite end terminated respectively at the first terminal 103 of the first, second and third power feeding equipment. In FIG. 1 a further branching unit 1, together with the corresponding land station 101, PFE 102 and cable branch 104, is shown in phantom line to indicate one or more additional and optional branching unit(s) and corresponding branch(es).

Preferably each power feeding equipment 102 has a respective second terminal 105 connected to the sea earth 6.

In the present description, claims and figures, the optical and/or electro optical elements (e.g. optical fibers, amplifiers, receivers, transmitters, splitters, OADMs, etc) of the optical telecommunication link and system are not shown or described since they are not concerned in the power feeding to which the present invention concerns. However the present invention contemplates the presence of such elements as needed for telecommunication purpose.

The branching unit 1 comprises a fourth terminal 5 for connection to a sea earth 6 in use. Preferably a sea earth cable 7 connects the fourth terminal to the water 6 in which the branching unit is submerged, in use.

The branching unit 1 comprises a circuit 8 comprising a plurality of high voltage (e.g. vacuum) relays (three in the example of FIG. 2 and nine in the example of FIG. 3) and structured for connecting together two terminals out of the group consisting in the first, second and third terminal 2, 3 and 4 and for connecting the remaining terminal of the group consisting in the first, second and third terminal to the fourth terminal 5, depending on a sequence of power feeding at the first, second and third terminals, in use.

In the present description and figures several electrical or electronic components needed or preferred for the proper function of the branching unit, e.g. for component protection or other functions, are not shown or described in details since they are well known in the art and/or easily available to the person skilled in the art. For example, each relay coil will have its own bridge rectifier and zener circuit (not shown).

Figure 2:
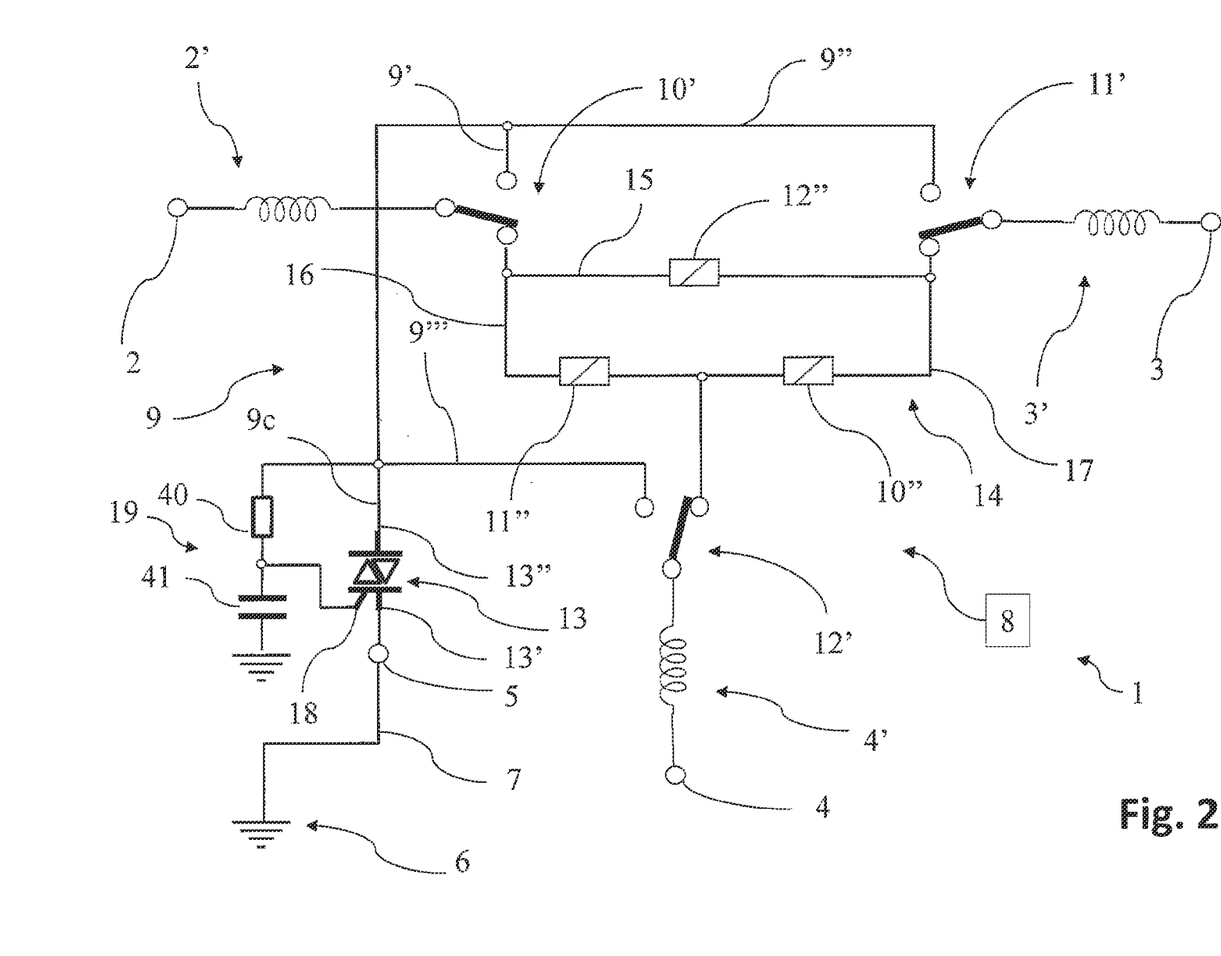
FIG. 2 shows in terms of logical blocks a schematic diagram of a first embodiment of the branching unit in accordance with the present invention, in its quiescent state.
Figure 3:
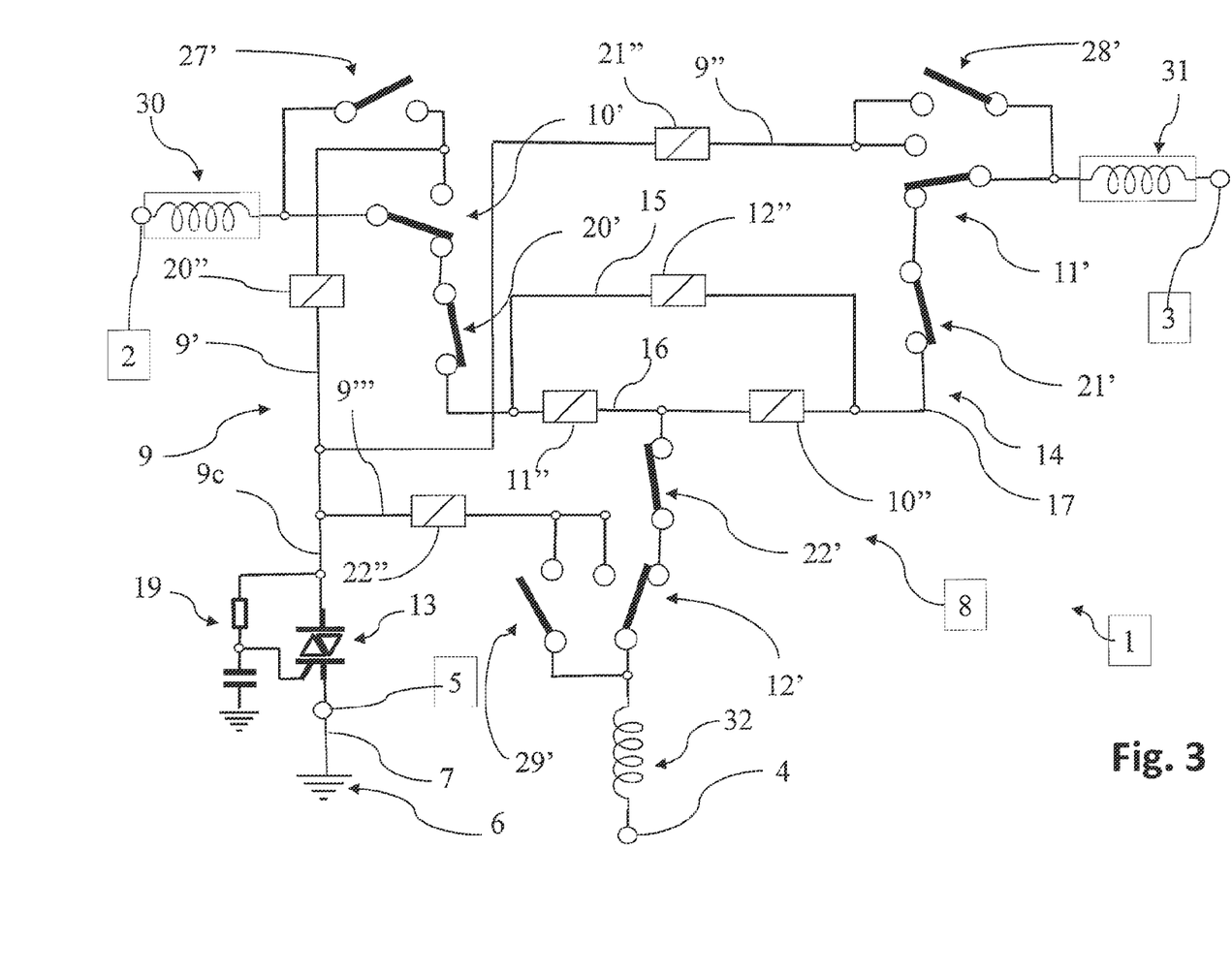
FIG. 3 shows in terms of logical blocks a schematic diagram of a second embodiment of the branching unit in accordance with the present invention, in its quiescent state.

The plurality of relays comprises at least a first, a second and a third switchover (e.g. Single Pole Double Throw) relay having respectively a first 10', a second 11' and a third switch 12' and respectively a first 10", a second 11" and a third actuator 12" (e.g. a coil). The first, second and third relay are associated to respectively the first, second and third terminal.

Preferably the circuit comprises a sea earth circuit 9 terminated at one end at the fourth terminal 5 and at least at three other ends respectively at the first, second and third switch.

Preferably the first 10', second 11' and third switch 12' (e.g. single pole double throw) have a respective first contact (single pole) belonging respectively to a first 2', second 3' and third termination line 4', a respective second contact (first throw), a respective third contact (second throw) belonging to the sea earth circuit 9 and a respective mobile contact, the respective actuator of each relay being configured for actuating the mobile contact so as to connect the first contact with either the second contact or the third contact.

Preferably the circuit 8 comprises a first 2', a second 3' and a third 4' termination line respectively terminated at one end to the first, second and third terminal and at another opposite end to the respective first contact of respectively the first, second and third switch.

Preferably the sea earth circuit 9 comprises a first 9', a second 9" and a third earth line 9''' terminated at two respective opposite ends respectively to the fourth terminal 5 and to the respective third contact of respectively the first, second and third switch. Preferably the sea earth circuit comprises a common section 9c common to the first, second and third earth line and terminated at the fourth terminal 5.

Preferably the circuit 8 comprises a bidirectional triode thyristor 13 placed along the common section 9c of the sea earth circuit 9 with a first main terminal 13' on the side of the fourth terminal 5 and a second main terminal 13" on the opposite side.

Preferably the branching unit 1 comprises a driving circuit 19 for driving the bidirectional triode thyristor 13, the driving circuit being configured for triggering the bidirectional triode thyristor in a conduction state only upon complete switchover of one relay of the group consisting in the first, second and third relay.

The present invention also envisages embodiments (not shown) comprising a plurality of bidirectional triode thyristors, for example three bidirectional triode thyristors placed respectively along the first, second and third earth line in a respective section not in common with the other earth lines and with either a common or a respective driving circuit, for example with the respective gate being driven by the current in the respective earth line.

Preferably the circuit 8 comprises a first line 15 terminated at two opposite ends to the second contacts of respectively the first and second switch, a second line 16 terminated at two opposite ends to the second contacts of respectively the first and the third switch and a third line 17 terminated at two opposite ends to the second contacts of respectively the second and third switch.

Figure 4:
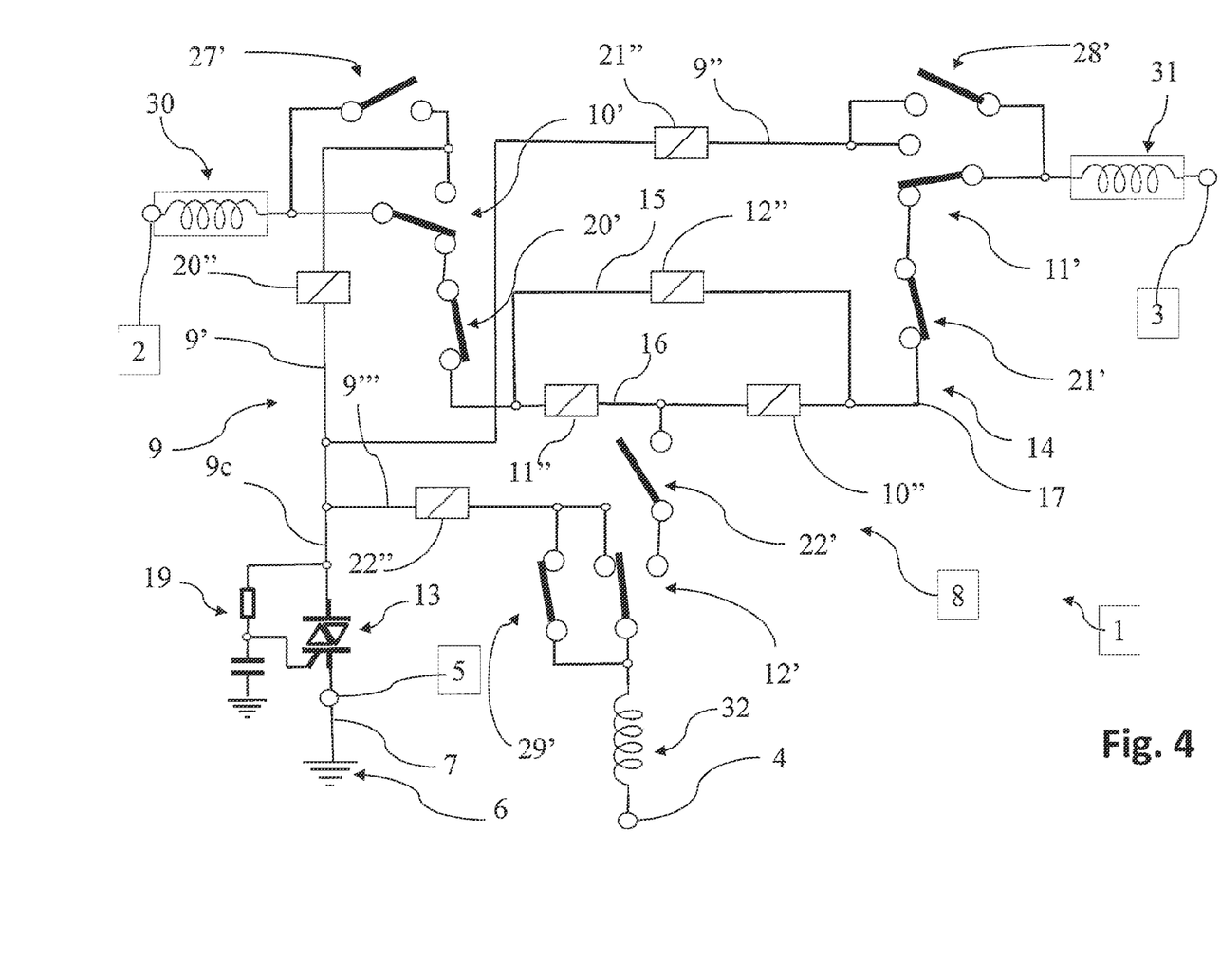
FIG. 4 shows in terms of logical blocks a schematic diagram of the second embodiment of the branching unit in accordance with the present invention, in one operational configuration.

In the embodiments shown in FIGS. 2-4, a common section of the first 15 and the second line 16 is terminated at one end at the second contact of the first switch 10', a common section of the first 15 and the third line 17 is terminated at one end at the second contact of the second switch 11' and a common section of the second 16 and the third line 17 is terminated at one end at the second contact of the third switch 12'. However (not shown), the common section may alternatively consists only in the respective second contact of the respective switch.

Preferably the first, second and third switch are configured so that when the respective actuator is not powered (quiescent state, as shown in FIGS. 2 and 3), the respective mobile contact connects the first contact with the second contact.

Preferably the respective actuator 10", 11", 12" of the first, second and third relay are placed respectively along the third line 17, the second line 16 and the first line 15, so as to be subject only to the respective current along the line.

Preferably the gate terminal 18 of the bidirectional triode thyristor 13 is directly connected to the common section of the sea earth circuit on the side of the second main terminal via the driving circuit 19, in order to receive the current/voltage across the common section of the sea earth circuit. However, in the present invention the driving circuit may be any circuit configured for driving the bidirectional triode thyristor so that the latter become triggered only when one among the first, second and third relay has switched over. For example (not shown) the driving circuit may trigger the bidirectional triode thyristor in function of the current across the first, second or third line (depending on which terminals are connected therebetween during configuration), said current being at a level which guarantees that the actuator along the line has switched-over the respective switch-over switch.

Preferably the driving circuit 19 comprises an RC circuit (resistor 40 and capacitor 41) placed along a line feeding the gate terminal 18.

Preferably the circuit 8 comprises a first 30, a second 31 and a third inductor 32 placed along respectively the first 2', second 3' and third termination line 4'. Preferably the inductors have an inductance equal to 250 µH, a maximum time rate of change of the current across them of about 100 A/µs and a maximum time rate of change of the voltage across them of about 1 kV/µs.

As exemplarily shown in the embodiment of FIGS. 3 and 4, preferably the plurality of relays comprises a fourth, a fifth and a sixth relay having respectively a fourth 20', a fifth 21' and a sixth switch 22' and respectively a fourth 20", a fifth 21" and a sixth actuator 22".

Preferably the fourth 20', fifth 21' and sixth switch 22' are placed along a respective common section of respectively the first 15 and the second line 16, the first 15 and the third line 17 and the second 16 and the third line 17 so as to either open or close the respective common section, depending on a current along respectively the first, second and third sea earth line. Preferably the fourth, fifth and sixth switch (e.g. single pole single throw switch or toggle switch) have a respective first and second contact, the first contact being on the side of respectively the first, second and third switch, and a respective mobile contact, the respective actuator of each relay being configured for actuating the mobile contact so as to either connect the first and second contact or to isolate the first and second contact, depending on a current along respectively the first, second and third sea earth line.

Preferably the fourth, fifth and sixth switch are configured so that when the respective actuator is not powered (quiescent state, as shown in FIG. 3), the respective mobile contact connects the first contact with the second contact (i.e. normally closed).

Preferably the respective actuator of the fourth, fifth and sixth relay is placed along the first, second and third earth line respectively, in a respective section which is not in common with the respective other two lines (so as to be subject only to the current along the respective earth line). Preferably said plurality of relays comprises a seventh, an eighth and a ninth relay having respectively a seventh 27', an eighth 28' and a ninth switch 29' and respectively a seventh, an eighth and a ninth actuator which are preferably coincident with respectively the fourth 20", the fifth 21" and the sixth actuator 22" (even though it is in principle possible to place along the respective line a separate, additional actuator).

Preferably the seventh, eighth and ninth switch (e.g. single pole single throw switch or toggle switch) have a respective first contact in electrical connection with respectively the first, second and third termination line, a respective second contact in electrical connection with respectively the first, second and third earth line, and a respective mobile contact, the respective actuator of each relay being configured for actuating the mobile contact so as to either connect the first and second contact or to isolate the first and second contact, depending on a current along respectively the first, second and third sea earth line.

Preferably the seventh, eighth and ninth switch are configured so that when the respective actuator is not powered (quiescent state, as shown in FIG. 3), the respective mobile contact isolates the first contact with the second contact (i.e. normally closed).

Exemplarily, in order to configure the branching unit shown in FIG. 2 or 3 (for example, with reference to the branching unit of FIG. 3, into the operational state shown in FIG. 4), an increasing current/voltage is sent at the first 2 and second terminal 3 (with the line 104 corresponding to the third terminal 4 open at the corresponding land station 101) until actuator 12" drives the mobile contact of the switch 12' from the initial position (FIGS. 2 and 3) wherein it connects the third terminal 4 to the other terminals 2, 3 to a final position wherein the third terminal is connected to the third earth line 9''' of the sea earth circuit 9 and not to the main line 15 (in the first line 15, having a single actuator 12", the current is the double of that across the line connecting 10' and 11' passing through the actuators 10" and 11"). Any arc or arc transfer at the switch 12' is avoided (without the need to discharge the branch line 104 corresponding to the third terminal 4) by the fact that the bidirectional triode thyristor 13 is in the open state during switching and no current can flow in the sea earth circuit.

Only upon completion of the switchover of switch 12' the bidirectional triode thyristor 13 is triggered in the conductive state by a current at the gate terminal 18, either because of the discharge current from the branch line 104 connected to the third terminal 4 or because of (increasing) power feeding by the corresponding PFE 102.

In case of fault during operation, for example at the branch line corresponding to the second terminal 3, actuator 12" goes unpowered and the switch 12' return to its quiescent state. According to the present invention, the bidirectional triode thyristor 13 returns to its open state because of fall in the current across the sea earth circuit. Subsequently, the (surge) current crossing the second line 16 and actuator 11" may activate the second switch 11' to switch to sea earth. However, no arc will build up at the switch 11' since the bidirectional triode thyristor 13 is in the open state during switching of the latter.

It is noted that in the architecture as the one shown in FIG. 2, an arc may still occur at the switch 12' when it first returns to its quiescent state after fault.

This further problem is solved by an architecture as the one shown in FIGS. 3 and 4.

In order to configure the branching unit to the powered up configuration shown in FIG. 4, the procedure above described is followed. Upon triggering of the bidirectional triode thyristor 13, the current along the third terminal 4 (and the third earth line 9''') is increased until switching of both the switches 22' and 29' (FIG. 4).

In case of the fault above described, when the switch 12' return to its depowered state, the open switch 22' avoids any arc formation on it, while switch 29' maintains the current along the sea earth circuit (9''') and the third terminal 4 so as to avoid depowering of the actuator 22" and its related switches 22' and 29'.

The invention claimed is:

1. A branching unit for an optical telecommunication link, the unit comprising a first, a second and a third terminal for termination of conductors of respective branch cables in use, a fourth terminal for connection to a sea earth in use, and a circuit comprising a plurality of relays comprising at least a first, a second and a third relay associated to respectively the first, second and third terminal, the circuit being structured for connecting together two terminals out of the group consisting in the first, second and third terminal and for connecting to the fourth terminal the remaining terminal of the group consisting in the first, second and third terminal, depending on a sequence of power feeding at the first, second and third terminals, in use, wherein the circuit comprises a sea earth circuit terminated at one end to the fourth terminal and a bidirectional triode thyristor placed along the sea earth circuit, and wherein the branching unit comprises a driving circuit for driving the bidirectional triode thyristor, the driving circuit being configured for triggering the bidirectional triode thyristor in a conduction state after complete switch-over of one relay of the group consisting in the first, second and third relay.

2. The branching unit according to claim 1, wherein the driving circuit is configured for driving the bidirectional triode thyristor in function of a current across the sea earth circuit.

3. The branching unit according to claim 1, wherein a first main terminal of the bidirectional triode thyristor is on the side of the fourth terminal and a second main terminal on the opposite side and wherein the driving circuit is directly connected to the sea earth circuit on the side of the second main terminal, so as to receive a current flowing across the sea earth circuit.

4. The branching unit according to claim 1, wherein the sea earth circuit comprises a first, a second and a third earth line terminated at two respective opposite ends respectively at the fourth terminal and at respectively a first, a second and a third switch of respectively the first, second and third relay, and wherein the bidirectional triode thyristor is placed along a common section of the sea earth circuit common to the first, second and third earth line, the common section being terminated at the fourth terminal.

5. The branching unit according to claim 1, wherein the circuit comprises a first, a second and a third termination line respectively terminated at one end at the first, second and third terminal, wherein said first, second and third relay have respectively a first, a second and a third switch and respectively a first, a second and a third actuator, wherein the first, second and third switch have a respective first contact belonging respectively to the first, second and third termination line, a respective second contact, a respective third contact belonging to the sea earth circuit and a respective mobile contact, the respective actuator of each relay being configured for actuating the mobile contact so as to connect the first contact with either the second contact or the third contact, and wherein the circuit comprises a first line terminated at two opposite ends to the second contacts of respectively the first and second switch, a second line terminated at two opposite ends to the second contacts of respectively the first and the third switch and a third line terminated at two opposite ends to the second contacts of respectively the second and third switch, and wherein the first, second and third relay are configured for connecting respectively the first, second and third terminal either to the sea earth circuit or to the other two terminals in function of the current flowing across respectively the third, second and first line.

6. The branching unit according to claim 4, wherein the first, second and third switch are configured so that when the respective actuator is not powered, the respective mobile contact connects the first contact with the second contact.

7. The branching unit according to claim 1, wherein said plurality of relays comprises a fourth, a fifth and a sixth relay having respectively a fourth, a fifth and a sixth switch and respectively a fourth, a fifth and a sixth actuator, wherein the fourth, fifth and sixth switch are placed along a respective common section of respectively the first and the second line, the first and the third line and the second and the third line so as to either open or close the respective common section, depending on a current along the sea earth circuit, the fourth, fifth and sixth switch being configured so that when the respective actuator is not powered, the respective mobile contact close the respective common section.

8. The branching unit according to claim 7, wherein the respective actuator of the fourth, fifth and sixth relay is placed along the first, second and third earth line respectively and is not placed along respectively the other two earth lines.

9. The branching unit according to claim 7, wherein said plurality of relays comprises a seventh, an eighth and a ninth relay having respectively a seventh, an eighth and a ninth switch and respectively a seventh, an eighth and a ninth actuator, the seventh, eighth and ninth actuator being coincident with respectively the fourth, fifth and sixth actuator and wherein the seventh, eighth and ninth switch have a respective first contact in connection with respectively the first, second and third termination line, a respective second contact in connection with respectively the first, second and third earth line, and a respective mobile contact, the respective actuator of each relay being configured for actuating the mobile contact so as to either connect the first and second contact or to isolate the first and second contact, depending on a current along respectively a first, a second and a third sea earth line.

10. The branching unit according to claim 9, wherein the seventh, eighth and ninth switch are configured so that when the respective actuator is not powered, the respective mobile contact isolates the first contact with the second contact.

11. The branching unit according to claim 1, wherein the circuit comprises a first, a second and a third inductor placed along respectively the first, second and third termination line so as to limit a time rate of change of the current across them and/or a time rate of change of the voltage across them.

12. A branching unit for an optical telecommunication link, the unit comprising a first, a second and a third terminal for termination of conductors of respective branch cables in use, a fourth terminal for connection to a sea earth in use, and a circuit comprising a plurality of relays comprising at least a first, a second and a third relay associated to respectively the first, second and third terminal, the circuit being structured for connecting together two terminals out of the group consisting in the first, second and third terminal and for connecting the remaining terminal of the group consisting in the first, second and third terminal to the fourth terminal, depending on a sequence of power feeding at the first, second and third terminals, in use, wherein the circuit comprises a sea earth circuit terminated at one end to the fourth terminal, wherein the circuit comprises a first, a second and a third termination line respectively terminated at one end at the first, second and third terminal, wherein said first, second and third relay have respectively a first, a second and a third switch and respectively a first, a second and a third actuator, wherein the first, second and third switch have a respective first contact belonging respectively to the first, second and third termination line, a respective second contact, a respective third contact belonging to the sea earth circuit and a respective mobile contact, the respective actuator of each relay being configured for actuating the mobile contact so as to connect the first contact with either the second contact or the third contact in function of a current flowing across respectively the third, second and first line, wherein the circuit comprises a first line terminated at two opposite ends to the second contacts of respectively the first and second switch, a second line terminated at two opposite ends to the second contacts of respectively the first and the third switch and a third line terminated at two opposite ends to the second contacts of respectively the second and third switch, wherein said plurality of relays comprises a fourth, a fifth and a sixth relay having respectively a fourth, a fifth and a sixth switch and respectively a fourth, a fifth and a sixth actuator, wherein the fourth, fifth and sixth switch are placed along a respective common section of respectively the first and the second line, the first and the third line and the second and the third line so as to either open or close the respective common section, depending on a current along the sea earth circuit, the fourth, fifth and sixth switch being configured so that when the respective actuator is not powered, the respective mobile contact close the respective common section, wherein the sea earth circuit comprises a first, a second and a third earth line terminated at two respective opposite ends respectively at the fourth terminal and at respectively the first, second and third switch and wherein said plurality of relays comprises a seventh, an eighth and a ninth relay having respectively a seventh, an eighth and a ninth switch and respectively a seventh, an eighth and a ninth actuator, the seventh, eighth and ninth actuator being coincident with respectively the fourth, fifth and sixth actuator and wherein the seventh, eighth and ninth switch have a respective first contact in connection with respectively the first, second and third termination line, a respective second contact in connection with respectively the first, second and third earth line, and a respective mobile contact, the respective actuator of each relay being configured for actuating the mobile contact so as to either connect the first and second contact or to isolate the first and second contact, depending on a current along respectively a first, a second and a third sea earth line, the seventh, eighth and ninth switch being configured so that when the respective actuator is not powered, the respective mobile contact isolates the first contact with the second contact.

13. The branching unit according to claim 12, wherein the respective actuator of the fourth, fifth and sixth relay is placed along the first, second and third earth line respectively and is not placed along respectively the other two earth lines.

14. An optical telecommunication link comprising at least one submerged branching unit according to claim 1, a first, a second and a third land station comprising respectively a first, a second and a third power feeding equipment having respective first terminal, a first, a second and a third cable branch having a respective conductor continuously running along them and having a respective end terminated respectively at the first, second and third terminal of the branching unit and a respective opposite end terminated respectively at the first terminal of the first, second and third power feeding equipment.

15. Method for configuring the branching unit according to claim 1, the method comprising: sending a current at two terminals out of the group consisting in the first, second and third terminal until the circuit connects together said two terminals therebetween and connects the remaining terminal of the group consisting in the first, second and third terminal to the fourth terminal, by switching of a switch of a relay associated to the remaining terminal.

* * * * *